(12) United States Patent
Miyoshi (10) Patent No.: US 8,238,041 B2
(45) Date of Patent: Aug. 7, 2012

(54) LENS BARREL

(75) Inventor: Kaori Miyoshi, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 12/558,295

(22) Filed: Sep. 11, 2009

(65) Prior Publication Data

US 2010/0067120 A1  Mar. 18, 2010

(30) Foreign Application Priority Data

Sep. 12, 2008  (JP) .................................. 2008-234947

(51) Int. Cl.
*G02B 15/14* (2006.01)
(52) U.S. Cl. ........................................ 359/699; 359/694
(58) Field of Classification Search .................. 359/694, 359/699–701, 822–823, 826
See application file for complete search history.

(56) References Cited

U.S. PATENT DOCUMENTS 5,239,417 A * 8/1993 Eguchi et al. ................. 359/823
7,010,224 B2 * 3/2006 Nomura ........................ 359/701

FOREIGN PATENT DOCUMENTS

| JP | 58-111003 A | 7/1983 |
| JP | 5-333255 | 12/1993 |
| JP | 2002-236247 A | 8/2002 |
| JP | 2008-058581 | 3/2008 |

* cited by examiner

*Primary Examiner* — Ricky Mack
*Assistant Examiner* — Zachary Wilkes
(74) *Attorney, Agent, or Firm* — Canon USA Inc IP Division (57) ABSTRACT

The present invention provides a lens barrel that has a first barrel member and a second barrel member, and arranges the first barrel member on an outer circumference of the second barrel member to enable the first barrel member to move in an optical axis direction. The lens barrel includes a plurality of engaging members configured to be held by the first barrel member and engaged with an engagement groove formed in the second barrel member, and to move in the optical axis direction along the engagement groove when the second barrel member rotates, and an annular urging member provided in an outer circumferential portion of the first barrel member and configured to urge the plurality of engaging members to the engagement groove formed in the second barrel member.

6 Claims, 14 Drawing Sheets

LENS BARREL

BACKGROUND OF THE INVENTION

1. Field of the Invention

The present invention relates to a lens barrel, and more particularly, to a lens barrel used in a camera and an optical apparatus that enables a lens to move in an optical axis direction.

2. Description of the Related Art

Figure 14:
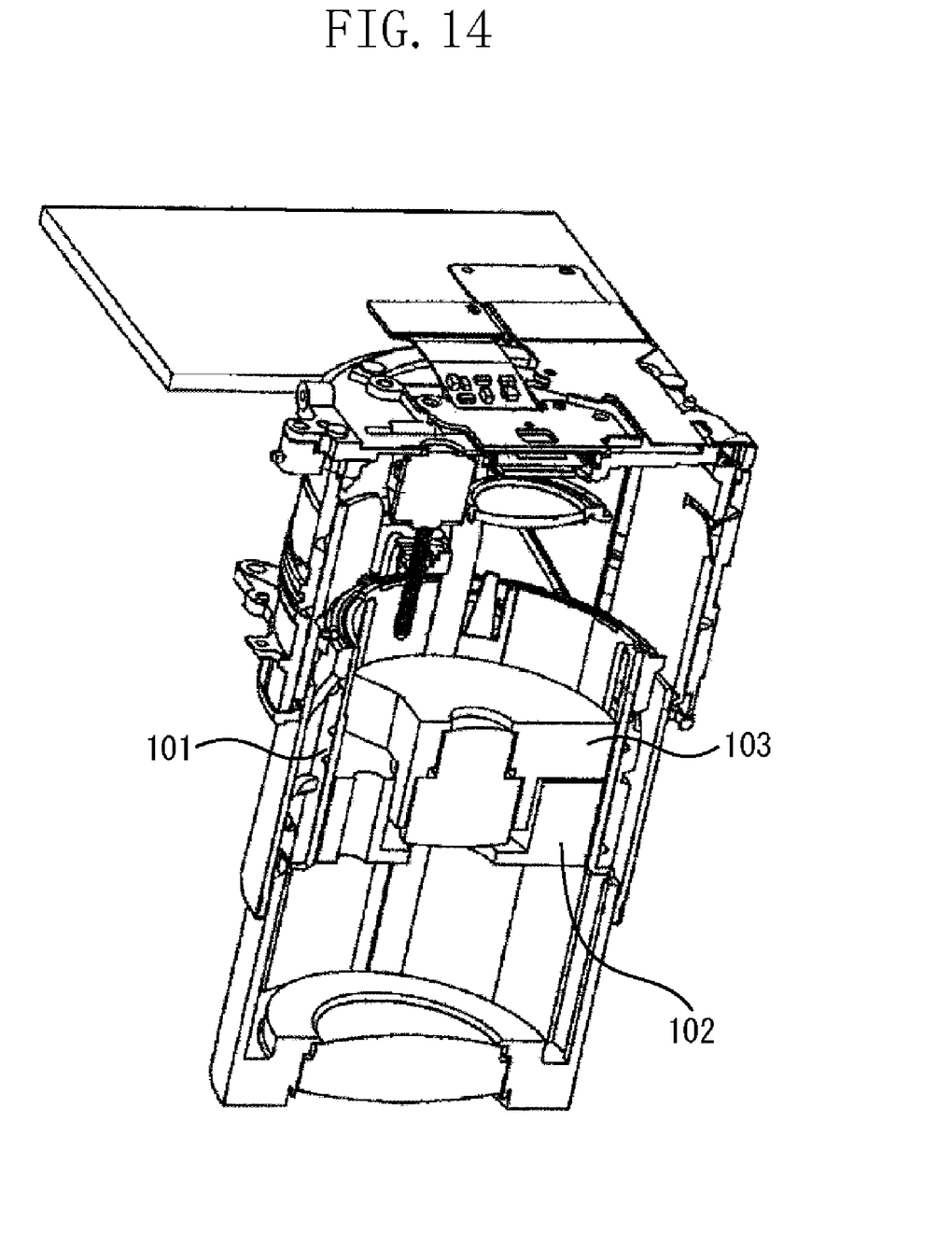
FIG. 14 illustrates a conventional lens barrels described in Japanese Patent Application Laid-Open No. 2008-58581.

In a conventional lens barrel used in a digital camera and the like, a mechanism of moving a lens in an optical axis direction includes a cam barrel that is provided with a cam groove and a lens holder having a lens and a cam pin, as illustrated in FIG. 14 of Japanese Patent Application Laid-Open No. 2008-58581.

In the conventional lens barrel, if the cam barrel rotates, the cam pin engaged with the cam groove at an inner circumference of the cam barrel is guided by an advance key along a lift of the cam groove and moved in the optical axis direction. As a result, the lens holder moves in the optical axis direction.

Further, in the mechanism that moves the lens in the optical axis direction, instead of the cam pin, a ball may be engaged with the cam groove, as discussed in Japanese Patent Application Laid-Open No. 05-333255.

However, in the lens barrel using the cam pin described in Japanese Patent Application Laid-Open No. 2008-58581, a driving load of the lens barrel may easily increase due to friction caused by line contact of the cam pin and the cam groove, when the lens is driven.

When the driving load of the lens barrel is large, a speed reduction ratio of a speed reduction gear train that connects a motor for driving the lens barrel and the lens barrel needs to be increased to increase driving torque. For this reason, if the lens barrel is driven at the same number of motor rotations as that of the lens barrel which shows a small driving load, a driving time of the lens barrel needs to be increased.

Further, if the lens barrel is driven at the number of motor rotations higher than that of the lens barrel which shows the small driving load to avoid an increase in the driving time of the lens barrel and equalize the driving time, driving noise of the lens barrel is increased.

Further, a backlash dealing with a component error may be set in advance to an engaging portion of the cam pin and the cam groove to reduce the driving load of the lens barrel caused by the component error. In this configuration, however, a problem occurs in keeping satisfactory precision of the lens.

Further, in the lens barrel using the ball instead of the cam pin as a follower, a ball follower may be dislocated from the cam groove due to an external force.

Accordingly, the lens barrel having the above configuration may be used only in a portion where the external force is not applied to, as described in Japanese Patent Application Laid-Open No. 05-333255.

SUMMARY OF THE INVENTION

The present invention relates to a technique capable of reducing a driving load of a lens barrel during a zoom operation and maximally reducing a possibility of dislocation of a lens holder due to an external force.

According to an aspect of the present invention, there is provided a lens barrel that has a first barrel member and a second barrel member, and arranges the first barrel member on an outer circumference of the second barrel member to enable the first barrel member to move in an optical axis direction. The lens barrel includes a plurality of engaging members configured to be held by the first barrel member and engaged with an engagement groove formed in the second barrel member, and to move in the optical axis direction along the engagement groove when the second barrel member rotates, and an annular urging member provided in an outer circumferential portion of the first barrel member and configured to urge the plurality of engaging members to the engagement groove formed in the second barrel member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

According to an exemplary embodiment of the present invention, in a lens barrel which has a barrel member that engages a ball instead of a cam pin with a cam groove and is movable in an optical axis direction, a driving load of the lens barrel during a zoom operation can be reduced, and a lens holder can be prevented from being dislocated due to an external force.

As a specific example of the exemplary embodiment, a lens barrel includes a lens holder that constitutes a first barrel member and a cam barrel that constitutes a second barrel member. The lens barrel in which the lens holder is disposed on an outer circumference of the cam barrel to be able to move in the optical axis direction includes the following members.

In order to enable the lens holder to move in the optical axis direction, a plurality of engaging members may be included which are held in the lens holder and engaged with the cam groove (engagement groove) formed in the cam barrel (second barrel member), and move in the optical axis direction along the cam groove when the cam barrel rotates.

In order to prevent the lens holder from being dislocated due to the external force, an annular urging member is provided in an outer circumferential portion of the lens holder and urges the plurality of engaging members to the cam groove formed in the cam barrel.

Further, the lens holder and the cam barrel function as external force contact portions which receive the external force by engaging with each other when the external force is applied to and are configured such that impact pins which are held by the lens holder can be engaged with an impact receiving groove formed in the cam barrel. By this configuration, a driving load of the lens barrel can be reduced, noise suppression and a high-speed zoom operation can be realized, and dislocation of the lens holder due to the external force can be prevented.

The lens barrel according to the exemplary embodiment of the present invention will be described below.

Figure 1:
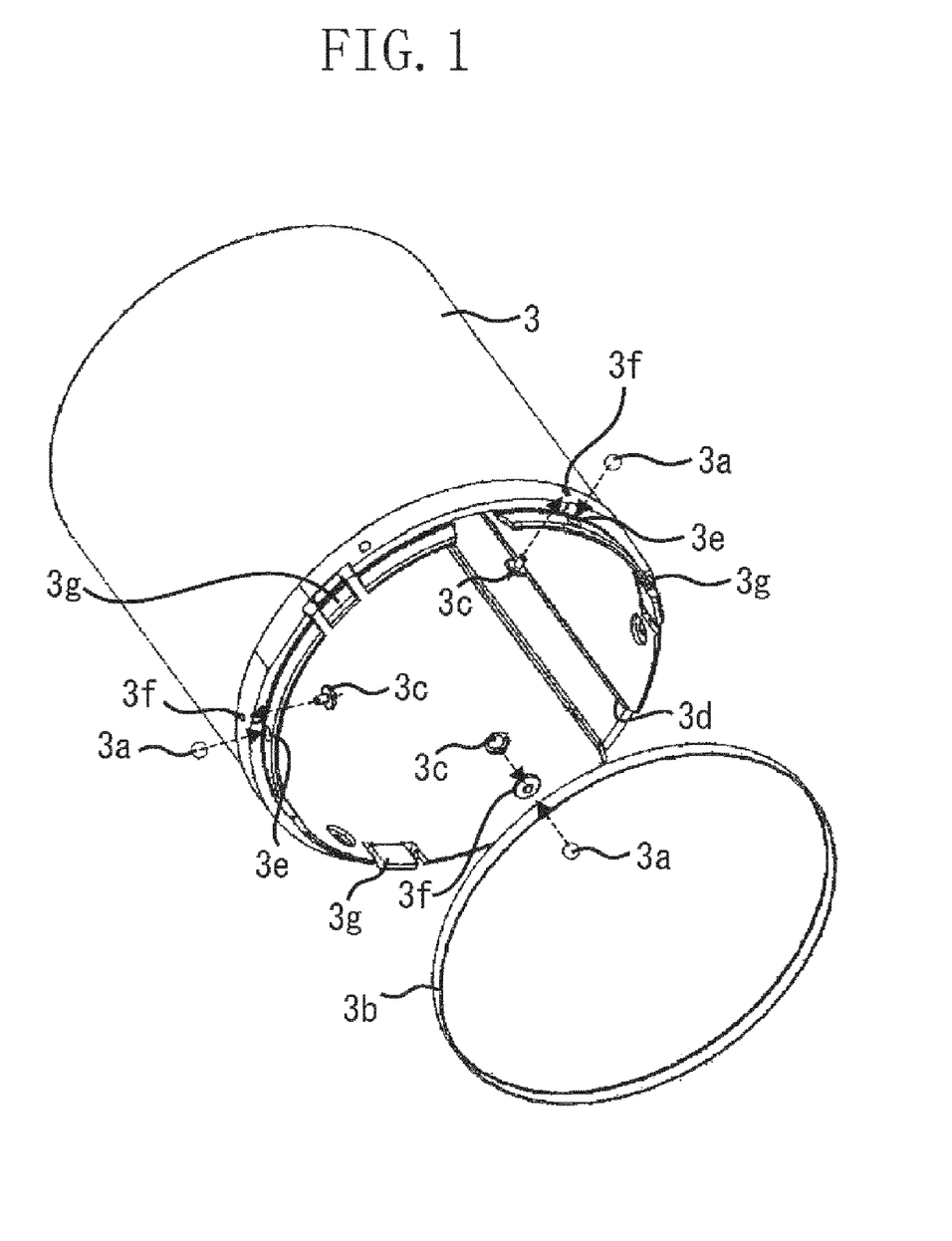
FIG. 1 is an exploded perspective view illustrating a configuration of a first unit lens of a retractable type lens barrel that includes first to fourth units lenses according to an exemplary embodiment of the present invention.
Figure 2:
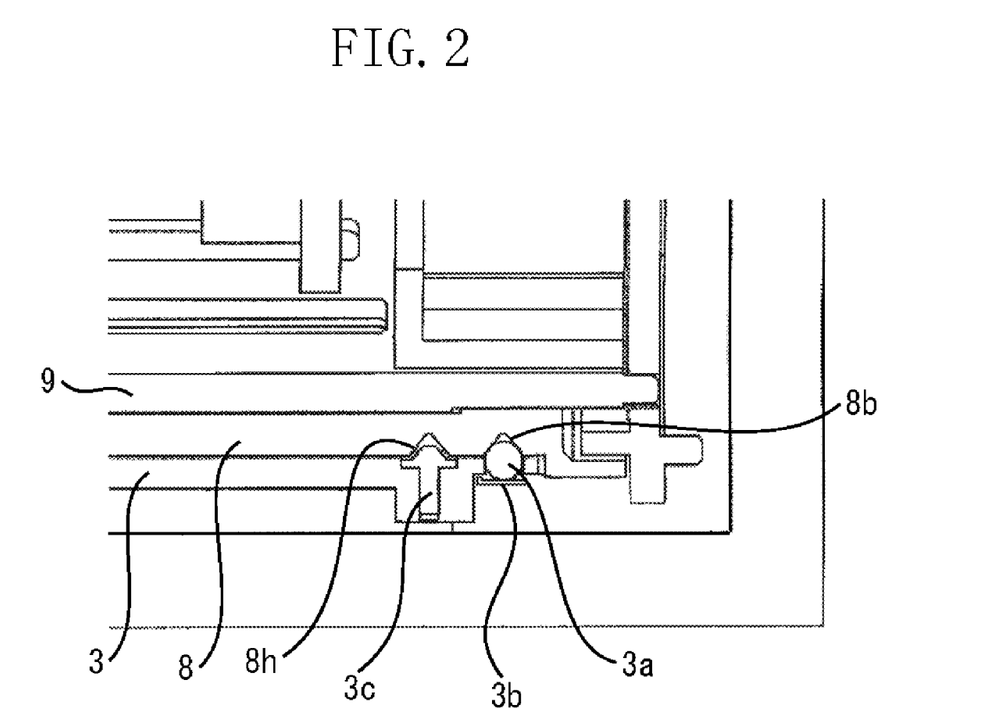
FIG. 2 is an enlarged cross-sectional view illustrating a ball follower portion of the first unit lens illustrated in FIG. 1 according to the exemplary embodiment of the present invention.
Figure 3:
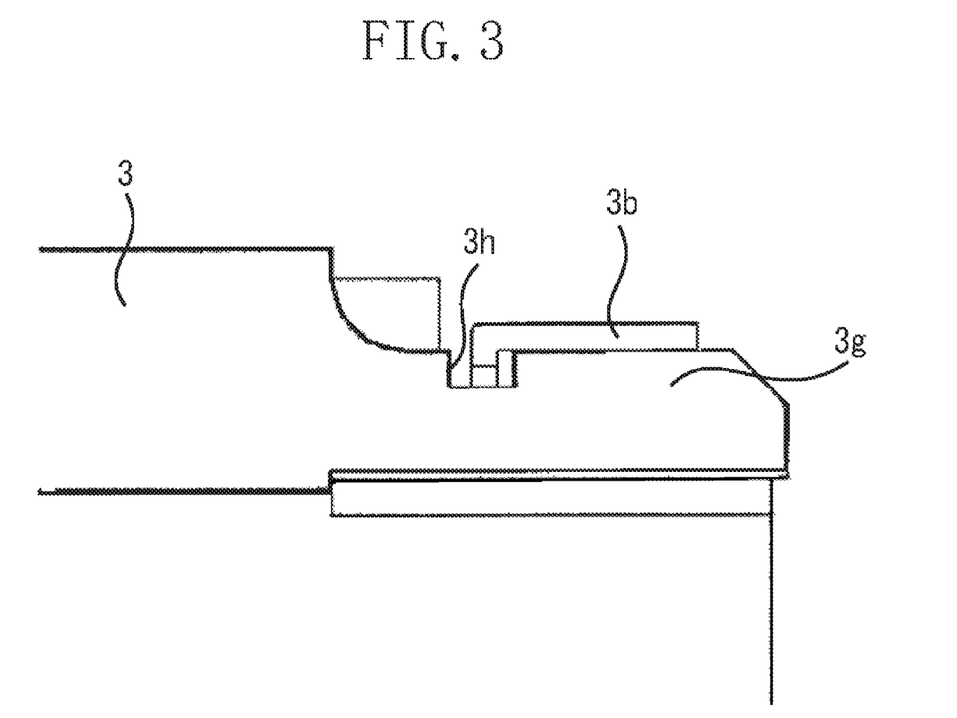
FIG. 3 is an enlarged cross-sectional view illustrating a ring spring supporting portion illustrated in FIG. 1 according to the exemplary embodiment of the present invention.
Figure 4:
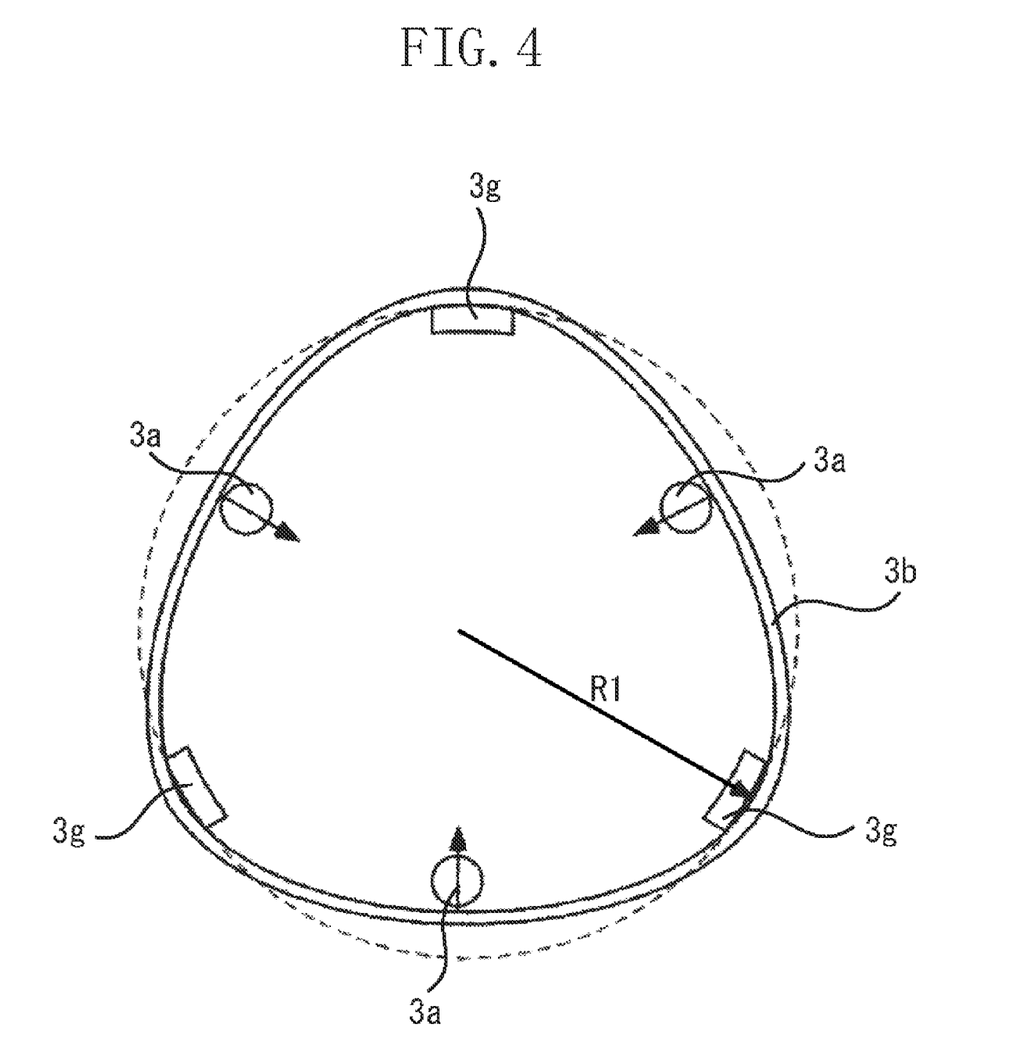
FIG. 4 illustrates a relationship between a ball follower and a ring spring according to the exemplary embodiment of the present invention.

FIG. 1 is an exploded perspective view illustrating a configuration of a first unit lens of a retractable type lens barrel that includes first to fourth lens units in the exemplary embodiment of the present invention. FIG. 2 is an enlarged cross-sectional view illustrating a ball follower portion of the first unit lens illustrated in FIG. 1. FIG. 3 is an enlarged cross-sectional view illustrating a ring spring supporting portion illustrated in FIG. 1. FIG. 4 illustrates a relationship between a ball follower and a ring spring.

First, the configuration of the first unit lens according to the present exemplary embodiment will be described using FIGS. 1 to 4. The lens barrel according to the present exemplary embodiment constitutes the retractable type lens barrel that includes the first to fourth lens units (refer to FIG. 5).

In FIG. 1, a first unit lens holder 3 that holds a first unit lens L1 includes three straight grooves 3d which are disposed 120 degrees apart from each other in an inner circumferential portion thereof. The first unit lens holder 3 includes ball followers 3a that are engaged with a cam groove, which is described in detail below, a ring spring 3b that urges the ball followers, and impact pins 3c.

The first unit lens holder 3 includes a through hole 3e into which the ball follower 3a is inserted from the outer circumference and a press fitting hole 3f into which the impact pin 3c is inserted from the inner side thereof. Three each of the through holes 3e and the press fitting holes 3f are disposed 120 degrees apart from each other on the first unit lens holder 3. Further, supporting portions 3g that support the ring spring 3b are provided at three places 120 degrees apart form each other, at a position which has approximately the same optical axis height as the ball follower 3a.

As illustrated in FIGS. 1 and 4, the number of the supporting portions 3g is three, and the three supporting portions 3g are disposed to exist between the ball followers.

The impact pin 3c is inserted into the press fitting hole 3f from an inner circumferential portion side of the first unit lens holder 3. The ball follower 3a is inserted into the through hole 3e from an outer circumferential portion side of the first unit lens holder 3. The through-hole is slightly tapered at the inner circumferential portion side, and the ball follower that is inserted from the outside is not dislocated inward.

After the three ball followers 3a are incorporated, the ring spring 3b is inserted into the outer circumferential portion of the first unit lens holder 3 to surround the ball followers 3a. At this time, the ring spring 3b is fitted into the outer circumferential portion to be supported at three points of the supporting portions 3g of the first unit lens holder 3.

As illustrated in FIG. 4, an inner diameter (R2) of the ring spring 3b is smaller than a diameter (R1) of a circle formed by connecting outermost points of the three points of the supporting portions 3g (R1>R2). Thus, when the ring spring is fitted into the supporting portion 3g, the ring spring needs to be deformed in a rounded triangular shape.

After the ring spring 3b is disposed in the first unit lens holder 3, since a portion other than the three points supported by the supporting portions 3g is distorted inward, the ball followers 3a are urged to the inner circumference by the distortion thereof. When the external force is applied to the first unit lens holder 3 and the ball follower 3a is released outward, the distortion form (distortion amount) of the ring spring is varied. As a result, the ring spring can absorb an impact force.

In the above description, the ring spring is supported by the supporting portions at the three points, but the present invention is not limited to this configuration. For example, the ring spring may be supported by a plurality of supporting portions at two or more points which are provided in the outer circumferential portion of the first unit lens holder 3. By this configuration, the ball follower 3a can be configured to urge the cam groove at the position where the ball follower is sandwiched by the supporting portions.

In the present exemplary embodiment, as illustrated in FIG. 3, the first unit lens holder 3 is formed to have a claw shape chamfered on a leading edge of the supporting portion 3g. When a force is applied to the supporting portion 3g, the first unit lens holder 3 can be distorted in a radial direction. Thus, when the ring spring 3b is assembled, if the ring spring 3b is embedded to be thrust in a thrust direction, the supporting portion is distorted inward along the chamfer of the leading edge, and the ring spring can be easily assembled.

Further, in the present exemplary embodiment, the ring spring 3b is manufactured by press machining. Producing a prototype of an annular metal component having a large diameter by cutting is expensive. However, if an inner circumferential portion is cut off after drawing press, the metal component can be formed into an annular shape, and costs can be kept low.

At this time, a margin is generated on the inner circumferential portion after the cutting off process. Thus, as illustrated in FIG. 3, a cross section of the ring spring 3*b* includes an L-shaped engaging portion.

By using this configuration, a notched recess portion 3*h* is provided in the supporting portion 3*g* and the L-shaped engaging portion is engaged with the notched recess portion 3*h*, so that the movement of the ring spring 3*b* in the thrust direction can be regulated. In this way, the present exemplary embodiment realizes a configuration which is easy to assemble, inexpensive, and can simply perform the thrust regulation.

The configuration of the lens barrel that includes the above-described first unit lens holder 3 will be described in detail below using FIGS. 5 to 12.

Figure 5:
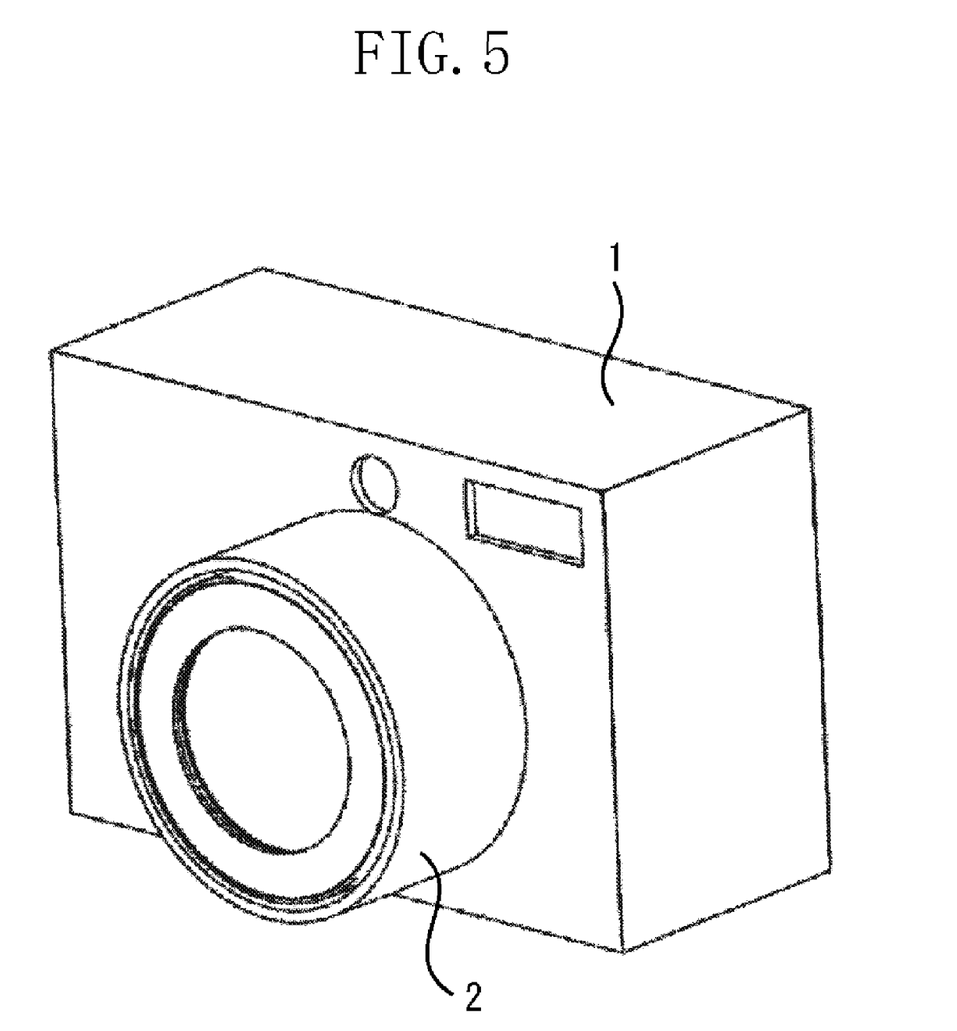
FIG. 5 is an exterior perspective view illustrating a camera having a lens barrel that includes first to fourth lens units according to the exemplary embodiment of the present invention.

FIG. 5 is an exterior perspective view illustrating a camera which has the lens barrel that includes first to fourth units lenses according to the exemplary embodiment of the present invention.

Figure 6:
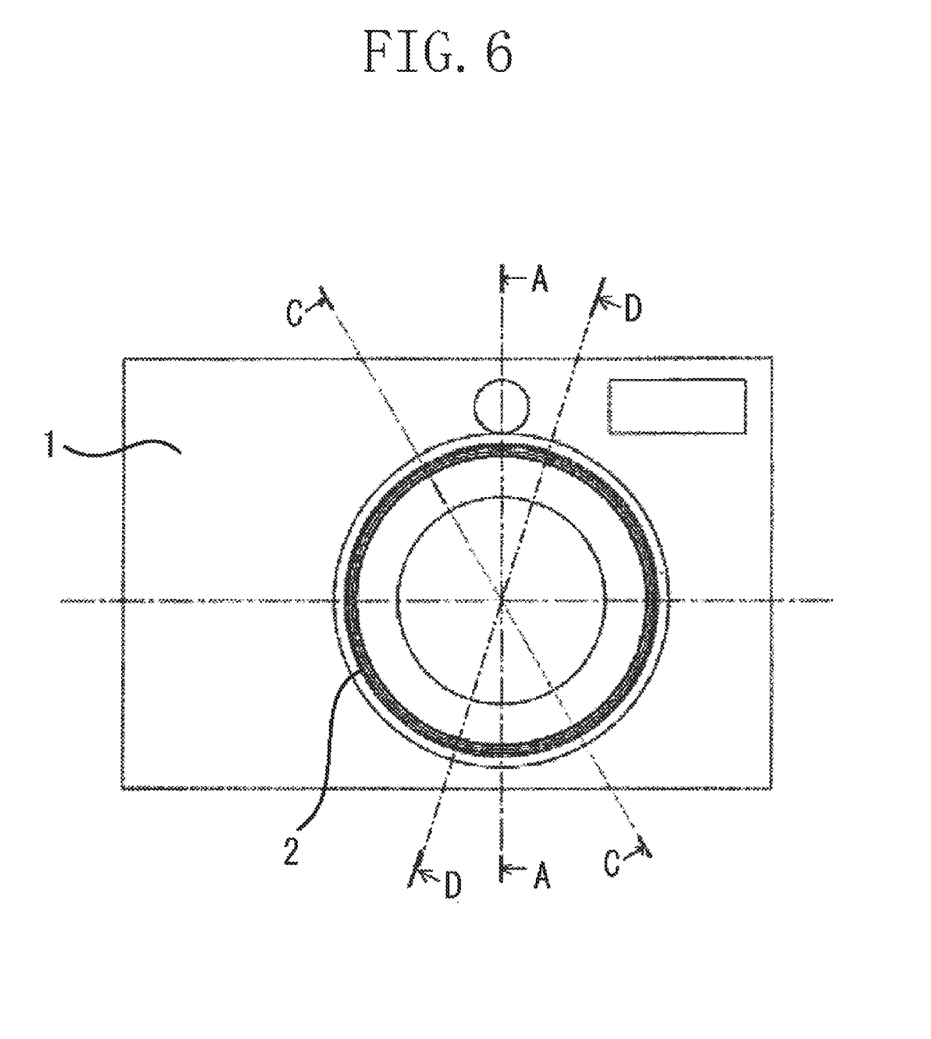
FIG. 6 is a front view illustrating the camera illustrated in FIG. 5 according to the exemplary embodiment of the present invention.
Figure 7:
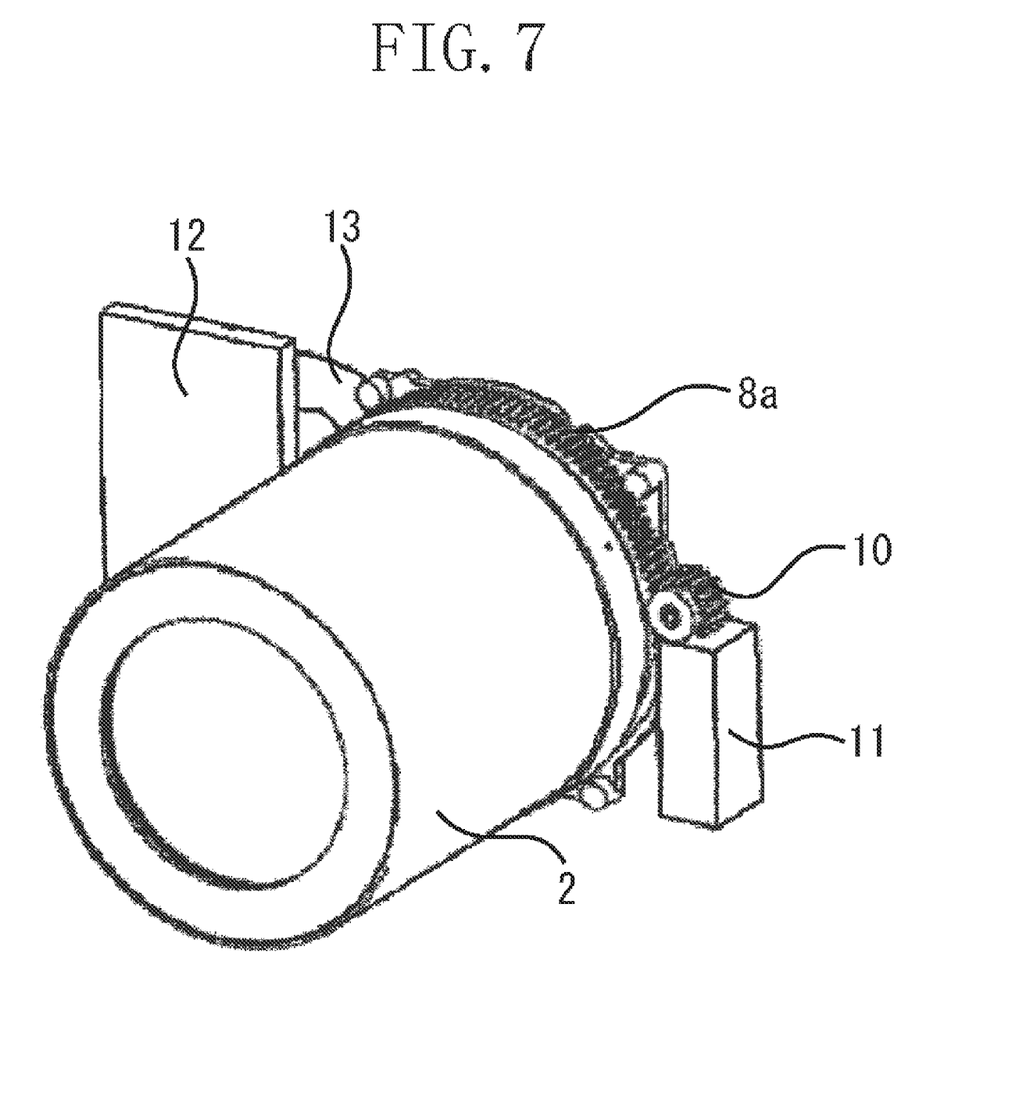
FIG. 7 is a perspective view illustrating a lens barrel according to the exemplary embodiment of the present invention.
Figure 8:
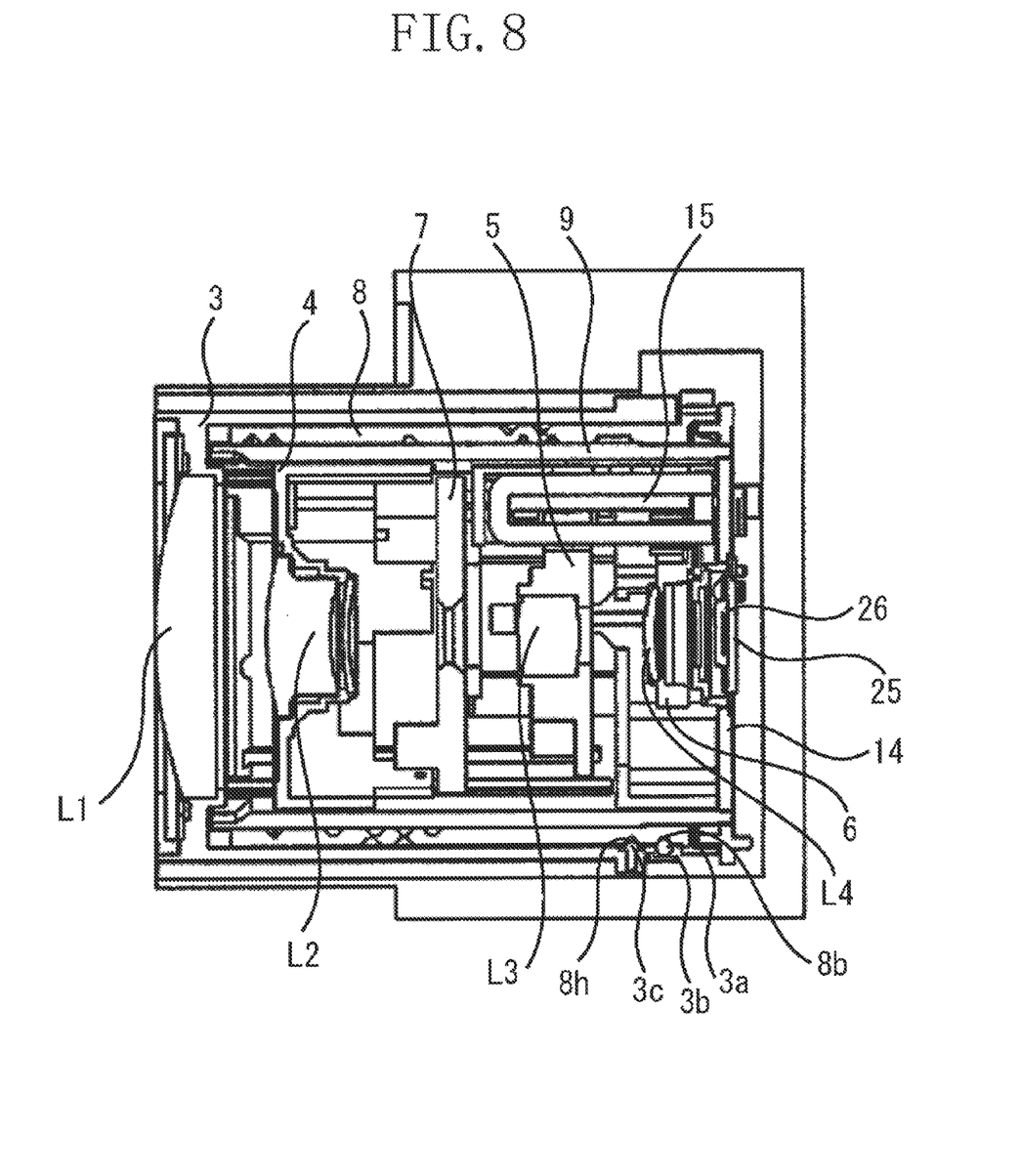
FIG. 8 is a cross-sectional view taken along a line A-A of FIG. 6, which illustrates an internal structure of the lens barrel according to the exemplary embodiment of the present invention.

FIG. 6 is a front view illustrating the camera illustrated in FIG. 5. FIG. 7 is a perspective view illustrating the lens barrel according to the present exemplary embodiment. FIG. 8 is a cross-sectional view taken along a line A-A of FIG. 6, which illustrates an internal structure of the lens barrel according to the present exemplary embodiment.

Figure 9:
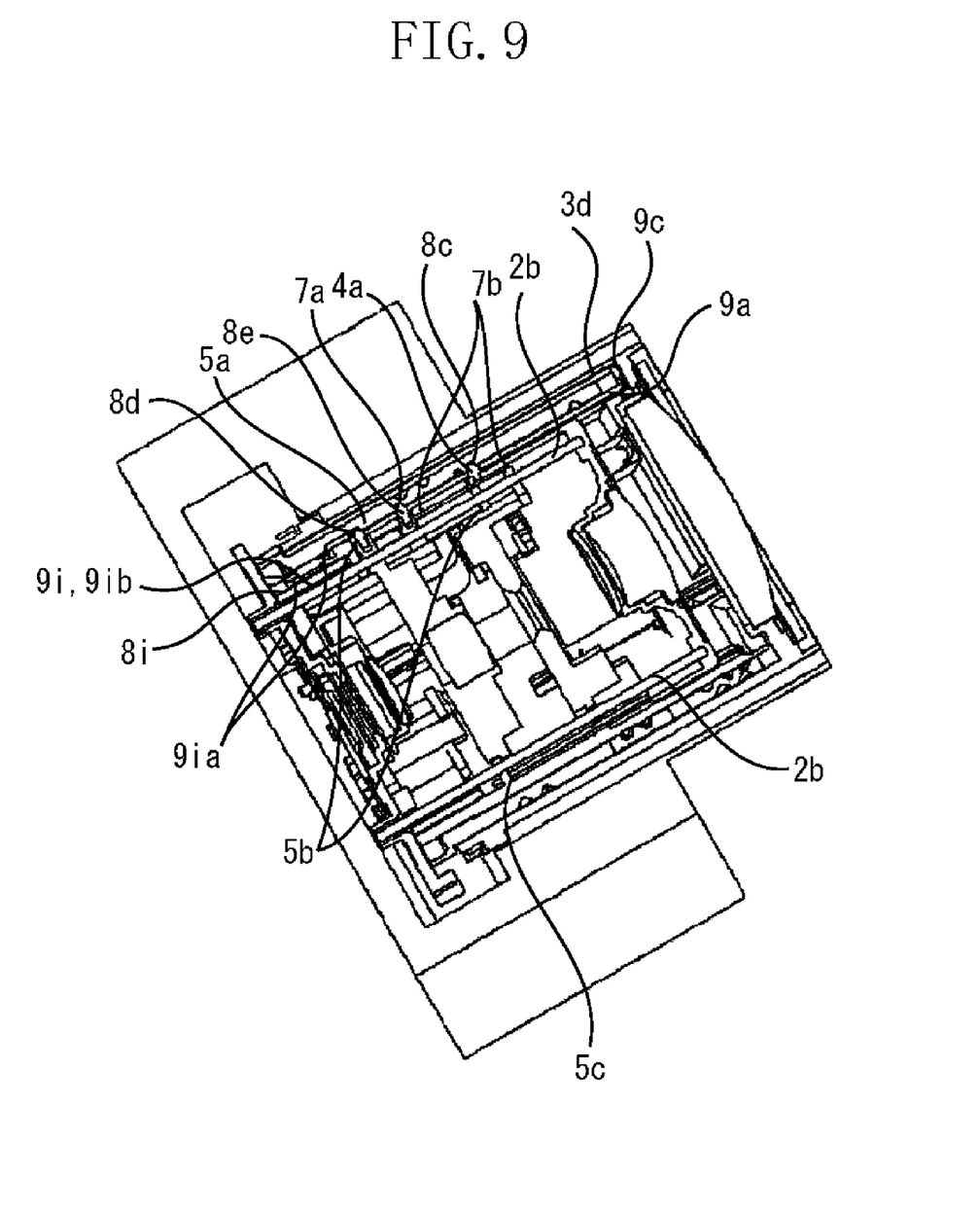
FIG. 9 is a cross-sectional view taken along a line C-C of FIG. 6, which illustrates an internal structure of the lens barrel according to the exemplary embodiment of the present invention.

FIG. 9 is a cross-sectional view taken along a line C-C of FIG. 6, which illustrates an internal structure of the lens barrel according to the present exemplary embodiment.

Figure 10:
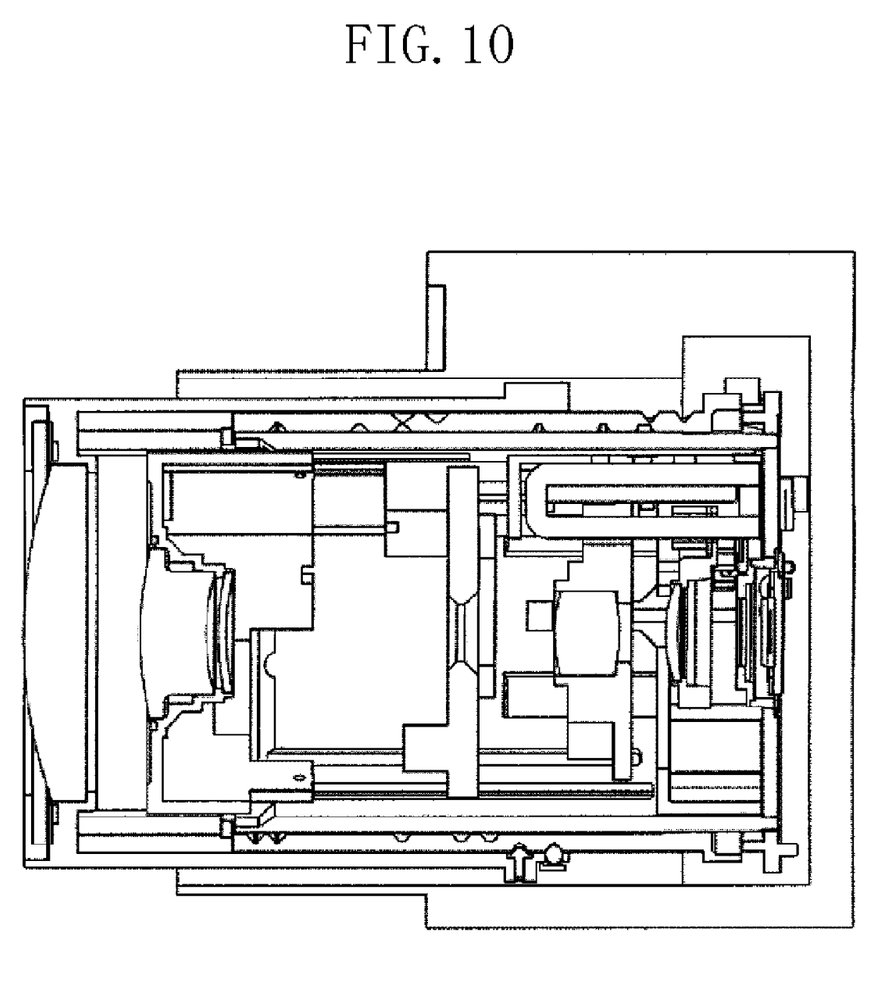
FIG. 10 is a cross-sectional view taken along the line A-A of FIG. 6, which illustrates an internal structure of a wide photographing state in the lens barrel according to the exemplary embodiment of the present invention.
Figure 11:
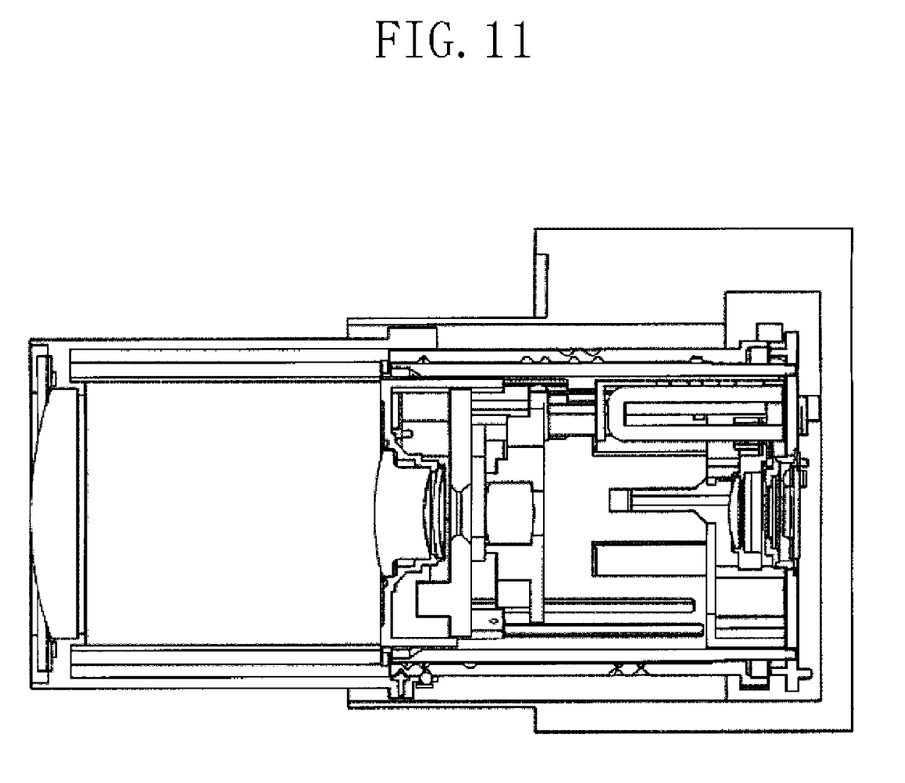
FIG. 11 is a cross-sectional view taken along the line A-A of FIG. 6, which illustrates an internal structure of a telephotographing state in the lens barrel according to the exemplary embodiment of the present invention.

FIG. 10 is a cross-sectional view taken along the line A-A of FIG. 6, which illustrates an internal structure of the lens barrel in a wide photographing state according to the present exemplary embodiment. FIG. 11 is a cross-sectional view taken along the line A-A of FIG. 6, which illustrates an internal structure of the lens barrel in a telephotographing state according to the present exemplary embodiment.

Figure 12:
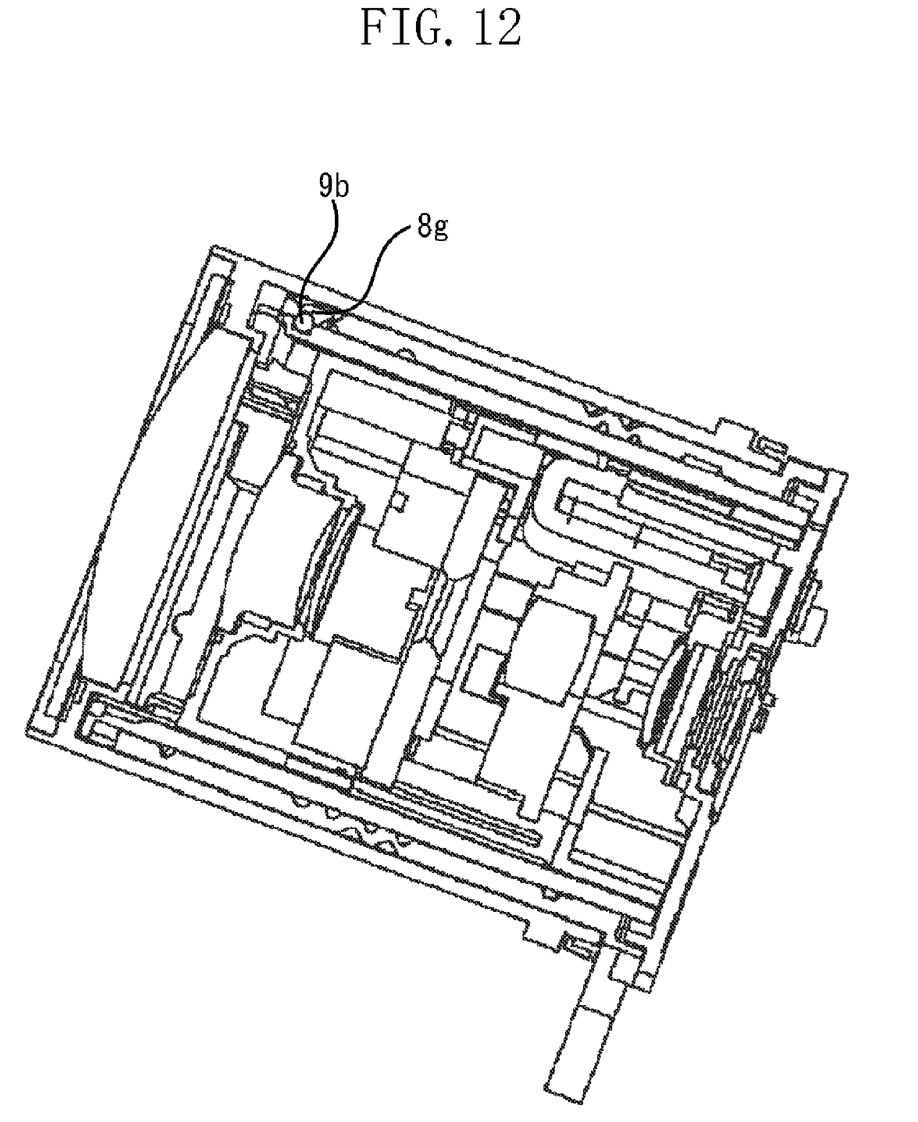
FIG. 12 is a cross-sectional view taken along a line D-D of FIG. 6, which illustrates an internal structure of the lens barrel according to the exemplary embodiment of the present invention.

FIG. 12 is a cross-sectional view taken along the line D-D of FIG. 6, which illustrates an internal structure of the lens barrel according to the present exemplary embodiment.

Figure 13:
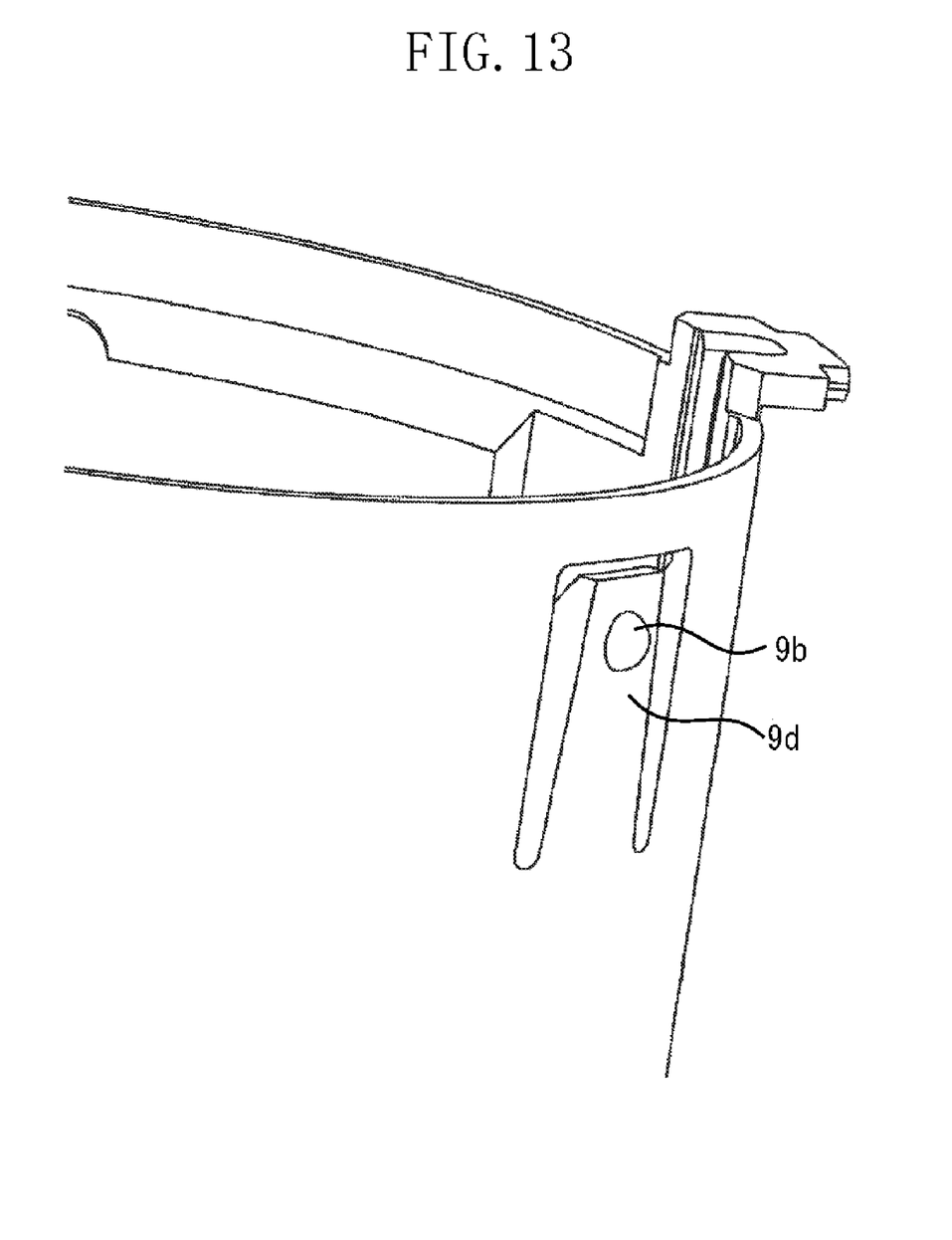
FIG. 13 is a perspective view illustrating a stationary barrel ball follower and a stationary barrel ball spring that are provided in a stationary barrel of a lens barrel according to the exemplary embodiment of the present invention.

FIG. 13 is a perspective view illustrating a stationary barrel ball follower and a stationary barrel ball spring provided in a stationary barrel of the lens barrel according to the present exemplary embodiment.

As illustrated in FIG. 5, a retractable type lens barrel 2 is provided on a front face of a camera 1. As illustrated in FIG. 8, the lens barrel 2 includes a first unit lens L1, a second unit lens L2, a third unit lens L3, and a fourth unit lens L4. The lens barrel 2 moves the fourth unit lens L4 in the optical axis direction to adjust a focal point.

As illustrated in FIGS. 8 to 12, the first unit lens L1 is held by the above-described first unit lens holder 3.

The second unit lens L2 is held by a second unit lens holder 4 that has a second unit cam pin 4*a* and a pair of second unit bars 2*b* extending in the optical axis direction.

The third unit lens L3 is held by a third unit lens holder 5 that has a third unit cam pin 5*a*, a third unit sleeve 5*b*, and a third unit vibration stopper 5*c*, and the fourth unit lens L4 is held by a fourth unit lens holder 6.

A shutter unit 7 has an SH cam pin 7*a*, an SH sleeve 7*b*, and an SH vibration stopper.

The third unit sleeve 5*b* and the SH sleeve 7*b* are fitted into one of the pair of the second unit bars 2*b* to be movable in the optical axis direction, and the third unit vibration stopper 5*c* and the SH vibration stopper 7*c* are fitted into the other of the pair of the second unit bars 2*b* to be movable in the optical axis direction.

At the inner circumference of the first unit lens holder 3 and the outer circumference of the second unit lens holder 4, a cam barrel 8 and a stationary barrel 9 are disposed.

The cam barrel 8 rotates around the optical axis. On an outer circumferential portion of the cam barrel 8, a gear portion 8*a*, a first unit cam groove 8*b*, and a first unit impact receiving groove 8*h* are provided. On an inner circumferential portion thereof, a second unit cam groove 8*c*, a third unit cam groove 8*d*, an SH cam groove 8*e*, a cam barrel driving cam groove 8*g*, and a roller guide 8*i* are provided.

As described above, the first unit ball follower 3*a* is urged to the inner circumference by the ring spring 3*b* and abuts the first unit cam groove 8*b*.

In the first unit impact receiving groove 8*h*, the first unit impact pin 3*c* is disposed at a proper interval in a normal driving state.

In an outer circumferential wall of the stationary barrel 9, second unit straight grooves 9*a* that have an elongated through hole shape and extend in the optical axis direction are disposed to be separated from each other in a circumferential direction at three places.

On an upper end surface of the stationary barrel 9 that has the same phase as the second straight groove 9*a*, a first unit advance key 9*c* is formed. The second unit cam pin 4*a* is fitted into the second unit straight groove 9*a* to be movable in the optical axis direction. The first unit advance key 9*c* is fitted into the first unit straight groove 3*d*.

As illustrated in FIGS. 12 and 13, on an outer circumferential portion of the stationary barrel 9, the stationary barrel ball followers 9*b* are rotatably mounted at three places to be separated from each other in a circumferential direction. At least one of the stationary barrel ball followers 9*b* is urged to the cam barrel driving cam groove 8*g* of the cam barrel 8 by the stationary barrel ball spring portion 9*d*, and the other two stationary barrel ball followers 9*b* are also thrust into the cam barrel driving cam groove 8*g* by a reactive force.

As illustrated in FIG. 9, a roller 9*i* is made from an elastic material, such as polyacetal. The roller 9*i* includes a pair of upper and lower shaft portions 9*ia* and a drum portion 9*ib* that is thicker than the shaft portions 9*ia*. The shaft portion 9*ia* of the roller 9*i* is rotatably pivoted to the stationary barrel 9, and the drum portion 9*ib* abuts the roller guide 8*i* of the roller cam barrel 8 and supports the cam barrel 8 to be able to rotate at the outer circumference of the stationary barrel 9.

The lens barrel 2 further includes a driving gear 10, a zoom driving device 11, a main board 12, a lens barrel flexible board 13, a charge coupled device (CCD) holder 14, and a fourth unit driving device 15 using a conventional voice coil.

The CCD holder 14 holds the stationary barrel 9, the driving gear 10, the zoom driving device 11, and the fourth unit driving device 15, and is fixed to the camera 1.

The main board 12 is connected to a CCD 26 on a CCD plate 25 via a wiring line (not illustrated), and the CCD 26 picks up a subject image formed by the lens barrel 2 and functions as a conventional digital camera.

Next, an operation of the retractable type lens barrel 2 will be described in detail.

If electricity is supplied from the main board 12 illustrated in FIG. 7 to the zoom driving device 11 via the lens barrel flexible board 13, the cam barrel 8 rotates around the stationary barrel 9 via the driving gear 10 which is connected to the gear portion 8*a* of the cam barrel 8.

If the cam barrel 8 rotates, the first unit ball follower 3*a* that is engaged with the first unit cam groove 8*b* of the cam barrel 8 at the inner circumference is guided by the first unit advance key 9c fitted into the first unit straight groove 3d along a lift of the first unit cam groove 8b and is moved in the optical axis direction.

Similarly, if the cam barrel 8 rotates, the second unit cam pin 4a engaged with the second unit cam groove 8c of the cam barrel 8 at the inner circumference is guided by the second unit straight groove 9a along a lift of the second unit cam groove 8c and is moved in the optical axis direction.

Similarly, if the cam barrel 8 rotates, the third unit cam pin 5a engaged with the third unit cam groove 8d of the cam barrel 8 at the inner circumference is guided by the second unit bar 2b along a lift of the third unit cam groove 8d and is moved in the optical axis direction.

Further, if the cam barrel 8 rotates, the SH cam pin 7a engaged with the SH cam groove 8e of the cam barrel 8 at the inner circumference is guided by the second unit bar 2b along a lift of the SH cam groove 8e and is moved in the optical axis direction.

Further, if the cam barrel 8 whose cam barrel driving cam groove 8g is engaged with the stationary barrel ball follower 9b of the stationary barrel 9 at the outer circumference rotates while guiding the roller guide 8i by the drum portion 9ib, the cam barrel 8 is moved in the optical axis direction from a state of FIG. 12 along a lift of the cam barrel driving cam groove 8g.

The fourth unit lens L4 is moved back and forth in the optical axis direction by the fourth unit driving device 15 and performs a focusing operation. As described above, if the first unit lens holder 3, the second unit lens holder 4, the third unit lens holder 5, the fourth unit lens holder 6, the shutter unit 7, and the cam barrel 8 move in the optical axis direction, the lens barrel 2 enters from a retracted state illustrated in FIGS. 8 and 9 to the wide photographing state illustrated in FIG. 10.

Further, if the cam barrel 8 rotates, the lens barrel 2 enters in the telephotographing state illustrated in FIG. 11.

An operation of the first unit lens holder 3 in the lens barrel 2 when the camera receives an external force due to a drop thereof will be described.

If an external force equal to or larger than the urging force of the ring spring 3b is applied to the first unit lens holder 3, the first unit ball follower 3a is dislocated from the first cam groove 8b. Therefore, the first unit impact receiving groove 8h and the first unit impact pin 3c engage with each other and receive the external force instead of the first unit ball follower 3a.

The impact pin engages with the impact receiving groove, so that the first unit lens holder can be prevented from being dislocated from the cam groove and not be returned to an original state.

In this state, if the external force applied to the first unit lens holder 3 is removed, the ball follower 3a is returned to the first unit cam groove 8b by the urging force of the ring spring 3b.

As described above, in the lens barrel which employs the ball instead of the cam pin, if a returning unit that urges the impact receiving groove and the ball to the cam groove is used in combination therewith, drop strength can be secured by returning the ball which is dislocated by the external force.

Since the ball can be used in the follower of the portion to which the external force is applied, a driving load of a lens barrel can be reduced as compared with a conventional lens barrel using a cam pin.

Further, while both the noise suppression and the high-speed zoom operation can be realized, it is possible to improve lens holding precision without causing the backlash of the follower and the cam groove.

Further, since the ball follower is dislocated from the cam groove while rolling, the cam groove is protected from being damaged, when the external force is applied to. If the cam groove is damaged, the backlash may be caused at the time of a zoom movement thereafter or the follower may be stuck in the damaged portion. However, according to the above described configuration of the exemplary embodiment, even though the external force is applied to, the lens can be zoomed smoothly.

According to the configuration of the exemplary embodiment in which the ball follower is urged by the annular spring (ring spring), as compared with the configuration where the ball follower is urged by a compression spring, following advantages can be achieved.

For example, in a configuration in which the ball follower is simply urged by the compression spring, when the size thereof is reduced, the urging force may be insufficient, the assembling may become difficult, and a space is required for securing the urging force.

On the contrary, as in the present exemplary embodiment, if the ball follower is urged by the annular spring (ring spring), a plurality of ball followers can be urged by one component, assembly thereof can be easy, and only a minimal space is required.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-234947, filed Sep. 12, 2008, which is hereby incorporated by reference herein in its entirety.

What is claimed is:

1. A lens barrel that has a first barrel member and a second barrel member, and arranges the first barrel member on an outer circumference of the second barrel member to enable the first barrel member to move in an optical axis direction, the lens barrel comprising:
   a plurality of supporting portions provided in an outer circumferential portion of the first barrel member, the plurality of supporting portions can be distorted in a radial direction when an external force is applied to the plurality of supporting portions;
   a plurality of engaging members configured to be held by the first barrel member and engaged with an engagement groove formed in the second barrel member, and to move in the optical axis direction along the engagement groove when the second barrel member rotates; and
   an annular urging member that is supported by the plurality of supporting portions at two or more points and provided in the outer circumferential portion of the first barrel member and configured to urge the plurality of engaging members to the engagement groove formed in the second barrel member, wherein an inner diameter of the annular urging member is smaller than a diameter of a circle formed by connecting outermost points of the plurality of supporting portions.

2. The lens barrel according to claim 1, wherein the plurality of engaging members is urged to the engagement groove formed in the second barrel member at positions where the plurality of engaging members is sandwiched by the supporting portions.

3. The lens barrel according to claim 1,
   wherein the first barrel member and the second barrel member have external force contact portions that engage with each other to receive an external force when the external force is applied.

4. The lens barrel according to claim 1,
wherein the plurality of engaging members includes a plurality of balls.

5. The lens barrel according to claim 2,
wherein the annular urging member includes engaging portions that are engaged with recess portions provided in the supporting portions, and a movement of the annular urging member in a thrust direction is regulated when the engaging portions are engaged with the recess portions.

6. The lens barrel according to claim 1,
wherein the annular urging member includes a ring spring.

* * * * *